United States Patent
Jain et al.

(10) Patent No.: US 8,428,006 B2
(45) Date of Patent: Apr. 23, 2013

(54) HIERARCHICAL CONTROL SIGNALING FOR MOBILE CLIENTS IN DISTRIBUTED WIRELESS CONTROLLER SYSTEM

(75) Inventors: Sudhir Jain, Fremont, CA (US); Patrice Calhoun, Pleasanton, CA (US); Abhijit Choudhury, Cupertino, CA (US); Rohit Suri, Fremont, CA (US); Ly Loi, Los Altos, CA (US); Bhanu Gopalasetty, San Jose, CA (US); Navindra Yadav, Cupertino, CA (US); Fusun Ertemalp, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 362 days.

(21) Appl. No.: 12/823,227

(22) Filed: Jun. 25, 2010

(65) Prior Publication Data

US 2011/0274037 A1    Nov. 10, 2011

Related U.S. Application Data

(63) Continuation-in-part of application No. 12/773,351, filed on May 4, 2010.

(51) Int. Cl.
*H04W 4/00* (2009.01)

(52) U.S. Cl.
USPC ........... 370/328; 370/338; 370/331; 370/401; 455/411; 455/436

(58) Field of Classification Search .................. 370/328, 370/329, 331, 252, 401; 455/411, 436
See application file for complete search history.

(56) References Cited

U.S. PATENT DOCUMENTS

| | | | |
|---|---|---|---|
| 5,758,281 A * | 5/1998 | Emery et al. ................. | 455/428 |
| 6,490,259 B1 | 12/2002 | Agrawal et al. | |

(Continued)

FOREIGN PATENT DOCUMENTS

WO    2010053624 A1    5/2010

OTHER PUBLICATIONS

Prommak C. et al., "Next Generation Wireless LAN System Design", Military Communications Conference, Milcom 2002, Proceedings, Anaheim, CA, Oct. 7-10 2002, NY, NY, US, vol. 1, Oct. 7, 2002, pp. 473-477.

(Continued)

*Primary Examiner* — Ricky Ngo
*Assistant Examiner* — Rasheed Gidado
(74) *Attorney, Agent, or Firm* — Edell, Shapiro & Finnan, LLC

(57) ABSTRACT

A system and method for a hierarchical distributed control architecture to support roaming wireless client devices. Access switches serve one or more Internet Protocol (IP) subnets that include plural IP addresses. The access switches are arranged in switch peer groups and store information about other access switches in that switch peer group and about locations of wireless client devices that are associated with any access switch in the switch peer group. The access switches are further grouped into a corresponding mobility sub-domain each including plural switch peer groups. Plural controller devices control access switches in a corresponding mobility sub-domain. Each controller device stores information about the access switches and about locations of wireless client devices within its mobility sub-domain. A central controller device communicates with the controller devices for the respective mobility sub-domains. The central controller device stores information about locations of wireless client devices in the mobility sub-domains.

23 Claims, 9 Drawing Sheets

U.S. PATENT DOCUMENTS

| | | | |
|---|---|---|---|
| 6,654,359 B1* | 11/2003 | La Porta et al. | 370/328 |
| 6,961,774 B1 | 11/2005 | Shannon et al. | |
| 6,970,459 B1 | 11/2005 | Meier | |
| 7,061,896 B2 | 6/2006 | Jabbari et al. | |
| 7,596,376 B2 | 9/2009 | Calhoun et al. | |
| 7,639,648 B2 | 12/2009 | Nagarajan et al. | |
| 2002/0085719 A1* | 7/2002 | Crosbie | 380/248 |
| 2004/0221042 A1 | 11/2004 | Meier | |
| 2004/0252653 A1 | 12/2004 | Shimizu et al. | |
| 2005/0036471 A1 | 2/2005 | Singh et al. | |
| 2005/0165953 A1 | 7/2005 | Oba et al. | |
| 2006/0187878 A1 | 8/2006 | Calhoun et al. | |
| 2006/0240825 A1 | 10/2006 | Funabiki et al. | |
| 2006/0245393 A1 | 11/2006 | Bajic | |
| 2006/0245404 A1* | 11/2006 | Bajic | 370/338 |
| 2007/0070959 A1 | 3/2007 | Almeroth et al. | |
| 2007/0140163 A1 | 6/2007 | Meier et al. | |
| 2007/0147300 A1 | 6/2007 | Jee et al. | |
| 2007/0160008 A1 | 7/2007 | Burgess | |
| 2007/0160017 A1 | 7/2007 | Meier et al. | |
| 2008/0002607 A1* | 1/2008 | Nagarajan et al. | 370/328 |
| 2008/0002642 A1* | 1/2008 | Borkar et al. | 370/338 |
| 2008/0043665 A1 | 2/2008 | Jeon et al. | |
| 2008/0107070 A1 | 5/2008 | Sastry | |
| 2008/0130598 A1 | 6/2008 | Kalhan | |
| 2008/0175201 A1 | 7/2008 | Ahmavaara et al. | |
| 2009/0059924 A1 | 3/2009 | Muramoto et al. | |
| 2009/0093232 A1 | 4/2009 | Gupta et al. | |
| 2009/0161590 A1 | 6/2009 | Lewis et al. | |
| 2010/0172293 A1* | 7/2010 | Toth et al. | 370/328 |
| 2010/0232306 A1 | 9/2010 | Jeon et al. | |
| 2010/0290398 A1 | 11/2010 | Choudhary et al. | |

OTHER PUBLICATIONS

International Search Report and Written Opinion in PCT/US2011/034883 dated Jul. 4, 2011.

Johnson et al., "Mobility Support in IPv6", Network Working Group, RFC 3775, Jun. 2004, pp. 1-143.

Narten et al., "Neighbor Discovery for IP Version 6 (IPv6)", Network Working Group, RFC 4861, Sep. 2007, pp. 1-84.

International Preliminary Report on Patentability and Written Opinion in counterpart International Application No. PCT/US2011/034883, mailed Nov. 15, 2012.

* cited by examiner

Control plane for roam within switch peer group

Station roams across mobility sub-domains

HIERARCHICAL CONTROL SIGNALING FOR MOBILE CLIENTS IN DISTRIBUTED WIRELESS CONTROLLER SYSTEM

RELATED APPLICATIONS

This application is a continuation-in-part of U.S. patent application Ser. No. 12/773,351, filed on May 4, 2010, the entirety of which is incorporated herein by reference.

This application is also related to the following commonly assigned co-pending U.S. patent applications filed on May 4, 2010:

U.S. patent application Ser. No. 12/773,360, entitled "Maintaining Point Of Presence At Tunneling Endpoint For Roaming Clients In Distributed Wireless Controller System."

U.S. patent application Ser. No. 12/773,355, entitled "Routing To The Access Layer To Support Mobility Of Internet Protocol Devices."

TECHNICAL FIELD

The present disclosure relates to networking techniques capable of supporting mobility of a network device.

BACKGROUND

Networked services to wired and wireless devices are supported by equipment that makes up what may be referred to as the "infrastructure" of the network. Examples of equipment in the network infrastructure include routers, access switches and control computers or servers that are used to store data pertaining to the status of devices that connect to the network. Some access switches have routing capabilities and in this regard are also referred to as "forwarders" because they forward packets from one access switch to another.

A device with networking capability, referred to herein as a "client device" or "station", may connect to the network at one access switch and then physically move, i.e., roam, such that it connects to a different access switch in the network. This roaming capability is prevalent with client devices that have wireless capabilities and can connect to a wired network at a different access switch by establishing a wireless connection, such as a wireless local area network (WLAN) connection with a wireless access point (AP) device.

Wireless is one of the many services being integrated within an access switch. The wireless service ensures that the access layer terminates the data plane, to facilitate the delivery of a converged architecture. Convergence implies that regardless of whether the traffic originates from a wired or wireless station the same set of features can be applied. There will be unification at the management and configuration level for the end customer, and wired and wireless will become an access method into the organization. Unification implies that mobility services are provided to both wireless and wired stations.

DESCRIPTION OF EXAMPLE EMBODIMENTS

Overview

A system and method are provided for a hierarchical distributed control architecture to support roaming of wireless devices. A plurality of access switches are provided and configured to serve one or more Internet Protocol (IP) subnets that comprises a plurality of IP addresses. The plurality of access switches are arranged in switch peer groups such that each access switch within a given switch peer group is configured to store information about other access switches in that switch peer group and about locations of wireless client devices that are associated with any wireless access point on any access switch in the switch peer group. The plurality of access switches are further grouped into a corresponding one of a plurality of mobility sub-domains each comprising a plurality of switch peer groups. A plurality of controller devices are provided, each configured to control access switches in a corresponding mobility sub-domain. Each controller device stores information about the plurality of access switches within its mobility sub-domain and about locations of wireless client devices at access switches in its mobility sub-domain. A central controller device is provided and configured to communicate with the plurality of controller devices for the respective mobility sub-domains. The central controller device is configured to store information about locations of wireless client devices in the mobility sub-domains.

In order to provide topology transparency to stations/devices as they roam within the network, the network infrastructure equipment needs to provide for seamless roaming. From the station's perspective, any mobility event should not change its IP address, its default router or Dynamic Host Configuration Protocol (DHCP) server. This means that as stations roam, they send an Address Resolution Protocol (ARP) request to their default router, or transmit a DHCP request to the server that had previously assigned its address. A hierarchical mobility architecture is provided that supports seamless mobility in networks where wireless services are terminated at the access switch. The point of presence of the roamed station stays at an access switch that serves the IP subnet for the station after it has roam to another access switch.

Example Embodiments

Figure 1:
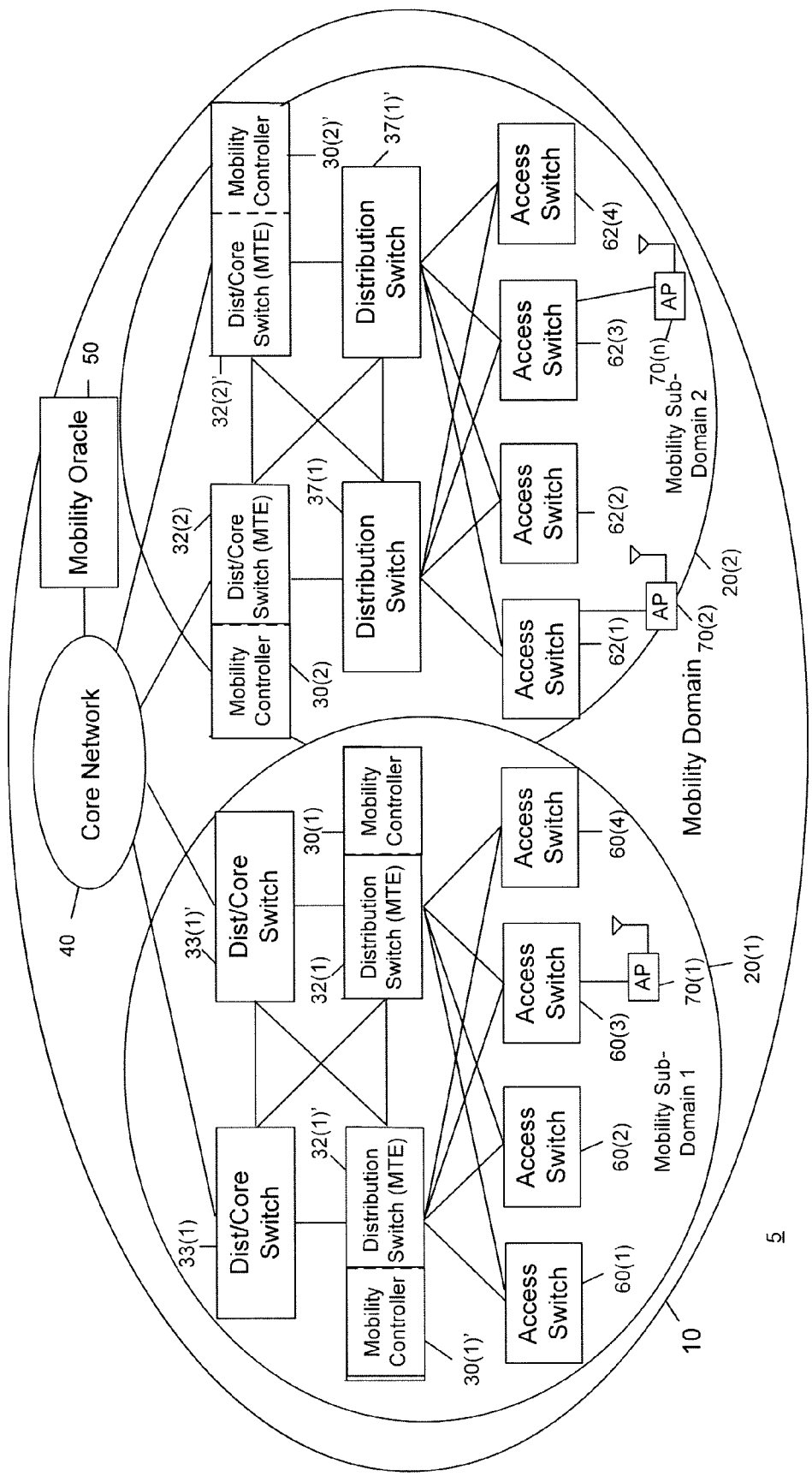
FIG. 1 is an example of a diagram of a network infrastructure architecture.

Reference is first made to FIG. 1. FIG. 1 illustrates a diagram depicting a network infrastructure architecture that is configured to support mobility of wireless client devices. The network architecture 5 comprises a mobility domain shown at reference numeral 10. A mobility domain is a geographical region for which roaming services are to be provided. Contiguous coverage is intended to be provided in this geographical region by the network architecture 5. The network architecture 5 provides better scaling properties over existing systems in that it breaks down the traditional mobility group into multiple mobility sub-domains. Thus, a mobility domain includes one or more mobility sub-domains. For simplicity, FIG. 1 shows two sub-domains 20(1) and 20(2) and labeled Mobility Sub-Domain 1 and Mobility Sub-Domain 2, respectively. For instance, a mobility sub-domain could consist of a single building within a campus. A sub-domain is more of a representation of the network topology than the physical walls of a building, so it is also possible for a mobility sub-domain to span multiple buildings in a campus, for example.

The network architecture 5 further comprises a mobility controller and a mobility oracle. In one form, each mobility sub-domain includes one or more mobility controllers (MCs) and mobility tunnel endpoint (MTE) pairs. While more than a single MC-MTE pair may be present in a sub-domain, only one may be active at any given time. The provision of multiple pairs in a sub-domain is for resilience and failure back up. In another form, a single MC is provided for the entire mobility domain. Said another way, for networks that consist of more than a single mobility sub-domain, the mobility oracle is provided. The mobility oracle is a centralized database that includes information on each of the stations in the mobility domain, the home mobility sub-domain for each station and the current foreign sub-domain providing service to each station. The mobility oracle is consulted by the individual MCs in order to facilitate inter mobility sub-domain mobility events.

FIG. 1 shows that in mobility sub-domain 20(1) there is a mobility controller 30(1) paired with an MTE 32(1) and a backup mobility controller 30(1)' paired with a backup MTE 32(1)'. Similarly, in mobility sub-domain 20(2) there is a mobility controller 30(2) paired with an MTE 32(2) and a backup mobility controller 30(2)' paired with a backup MTE 32(2)'. The MTE is a tunneling endpoint apparatus and its functions are described further hereinafter.

In the example architecture shown in FIG. 1, the functions of the MTEs in each sub-domain may be incorporated or integrated with other network equipment. For example, in sub-domain 20(1), the MTEs 32(1) and 32(1)' may be incorporated into a distribution switch and further connected to distribution/core switches 33(1) and 33(1)', respectively. The distribution/core switches 33(1) and 33(1)' are in turn connected to a core network 40 that represents a Layer 3 or "core" portion of the network architecture 5. In mobility sub-domain 20(2), the MTEs 32(2) and 32(2)' may be integrated into respective distribution/core switches that are in turn connected to the core network 40. In this case, there are distribution switches 37(1) and 37(1)' connected to MTEs 32(2) and 32(2)' in sub-domain 20(2).

A mobility controller provides the mobility control plane operations, facilitating mobility events that occur both within a mobility sub-domain, as well as across sub-domains. To this end, an entity called the mobility oracle 50 is provided. The mobility oracle 50 is a centralized control apparatus that comprises database that includes information on each of the client devices in the mobility domain, their home mobility sub-domain and the current foreign sub-domain providing service. The mobility oracle 50 is consulted by the individual mobility controllers in order to facilitate inter sub-domain mobility events. The mobility oracle 50 is shown coupled to the core network 40, but it may also be connected at the sub-domain level to any of the mobility sub-domains. As with the mobility sub-domain's mobility controller, more than one mobility oracle may be deployed for redundancy purposes, although only one would be active at any given time for the mobility domain.

Within each mobility sub-domain are access switches that provide the access layer connectivity to client devices operating in the mobility domain 10. For example, mobility sub-domain 20(1) has access switches 60(1)-60(4) and mobility sub-domain 20(2) has access switches 62(1)-62(4). Each access switch is capable of serving one or more IP subnets. An IP subnet comprises a plurality of IP addresses. An IP address for a client device can be assigned by a DHCP server, it can be statically configured on the client device or the client device can auto generate the IP address from a subnet served by its home access switch. It is possible that two or more access switches may serve the same IP subnet(s).

A client device obtains an IP address the first time it connects to the network, but it may also obtain another IP address thereafter. For example, an IPv6 client device can obtain a new IP address at any time, and thus can have multiple IP addresses. In general, the client device determines when to obtain an IP address.

Access switches within a mobility sub-domain may be grouped together in what is referred to herein as switch peer group. A switch peer group is statically configured by the MC, based on static information or information that is dynamically learned. Within a switch peer group, every switch has to have the same view of the membership of the group. A switch peer group does not span across mobility sub-domains or routing boundaries. A mobility sub-domain may have one or more switch peer groups. A purpose of the switch peer group is to allow access switches, between which client devices roam, to interact directly during handoff events. This permits a network to scale by eliminating the need for the MC to be involved in each and every handoff within a mobility sub-domain. Tunnels optionally directly connect the access switches in a switch peer group. If present, these tunnels allow data traffic to be directly sent from one access switch to another in the same switch peer group, without involving the MTE. Each MC for a mobility sub-domain is configured to generate data used to arrange access switches in its mobility sub-domain into switch peer groups, and to send information to the access switches in its mobility sub-domain in order to inform each access switch about the other access switches in its switch peer group.

As explained hereinafter, client devices associate to an access switch, either by a wired network connection, or a wireless network connection (through a wireless access point device). FIG. 1 shows wireless access point (AP) devices at reference numerals 70(1)-70(n). The AP devices support the Control and Provisioning of Wireless Access Points (CAPWAP) protocol. As the CAPWAP architecture specifies, the APs perform the physical (PHY) layer and real-time IEEE 802.11 MAC functions, which includes IEEE 802.11 encryption. The AP establishes a tunnel to the access switch to tunnel client devices' wireless traffic. Thus, an AP is said to be "on" an access switch when it is configured to tunnel traffic for a wireless device to the access switch.

The APs encrypt all CAPWAP control traffic using the Datagram Transport Layer Security (DTLS) protocol. If the AP supports Cisco TrustSec (CTS) or IEEE 802.1AE (MacSec) encryption, then a link between the switch and the AP may be protected by Layer 2 CTS, in which case both CAPWAP control messages and CAPWAP traffic will get encrypted. If CTS is not supported, then the CAPWAP data traffic is unencrypted. In one possible form, CAPWAP data traffic can also be DTLS encrypted as an option.

Each MTE provides mobility services on the data plane, ensuring that a client device's point of presence on the Layer 3 network remains constant across mobility events. An MTE's involvement in a routing scenario for a client device is optional in that the functions of the MTE are only utilized when tunneling is employed.

FIG. 1 shows the MTE function as being located in either the distribution or the distribution/core switch. The location of the MTE is shown in this way purely for illustrative purposes as it could reside in any number of devices, integrated in switches/routers or in stand-alone appliances. The actual embodiment of the MTE may depend upon the switches, routers and appliances supporting a tunneling process described herein. The MTE can have two different roles depending on the availability of the subnets for the roamed client device at the MTE. If the subnet of the roamed client device is available at the MTE, the MTE could become the point of presence; otherwise the MTE functions as a tunnel switching entity that connects the roamed client device to the point of presence, which could be an access switch. The MTE may be integrated in a border router in each sub-domain. In this example, the MTEs may be integrated with border or edge routers of their respective sub-domain. The MTE functions serves as a tunneling endpoint apparatus with respect to traffic for devices by tunneling the traffic to access switches in its mobility sub-domain, and in cases where a device roams to a different mobility sub-domain, by way tunneling traffic to another MTE in the foreign mobility sub-domain to which the device roams. This is described further hereinafter in connection with FIGS. 6-9.

FIG. 1 shows the MCs and the MTEs as co-located entities. Again, the MC handles the mobility control logic, while the MTE provides the data plane operations. The MC and MTE functions may be encompassed in a single physical entity. When integrated in a single entity or unit, the MC configures its data plane, the MTE function, through a set of application programming interfaces (APIs) or commands. Thus, in the MC/MTE single unit integrated configuration, the MTE is the data path of the MC. However, when the MC and MTE functions are embodied in separate entities, some additional signaling for the commands is necessary between the MC and the MTE. This would involve the MC forwarding portions of the signaling it had received from an access switch to configure the forwarding tables stored at the MTE. The separation of these functions makes it possible to deploy a network that does not make use of tunneling. Such a network would still require the mobility control plane, provided by the MC, but would not require the functions of the MTE.

Figure 2:
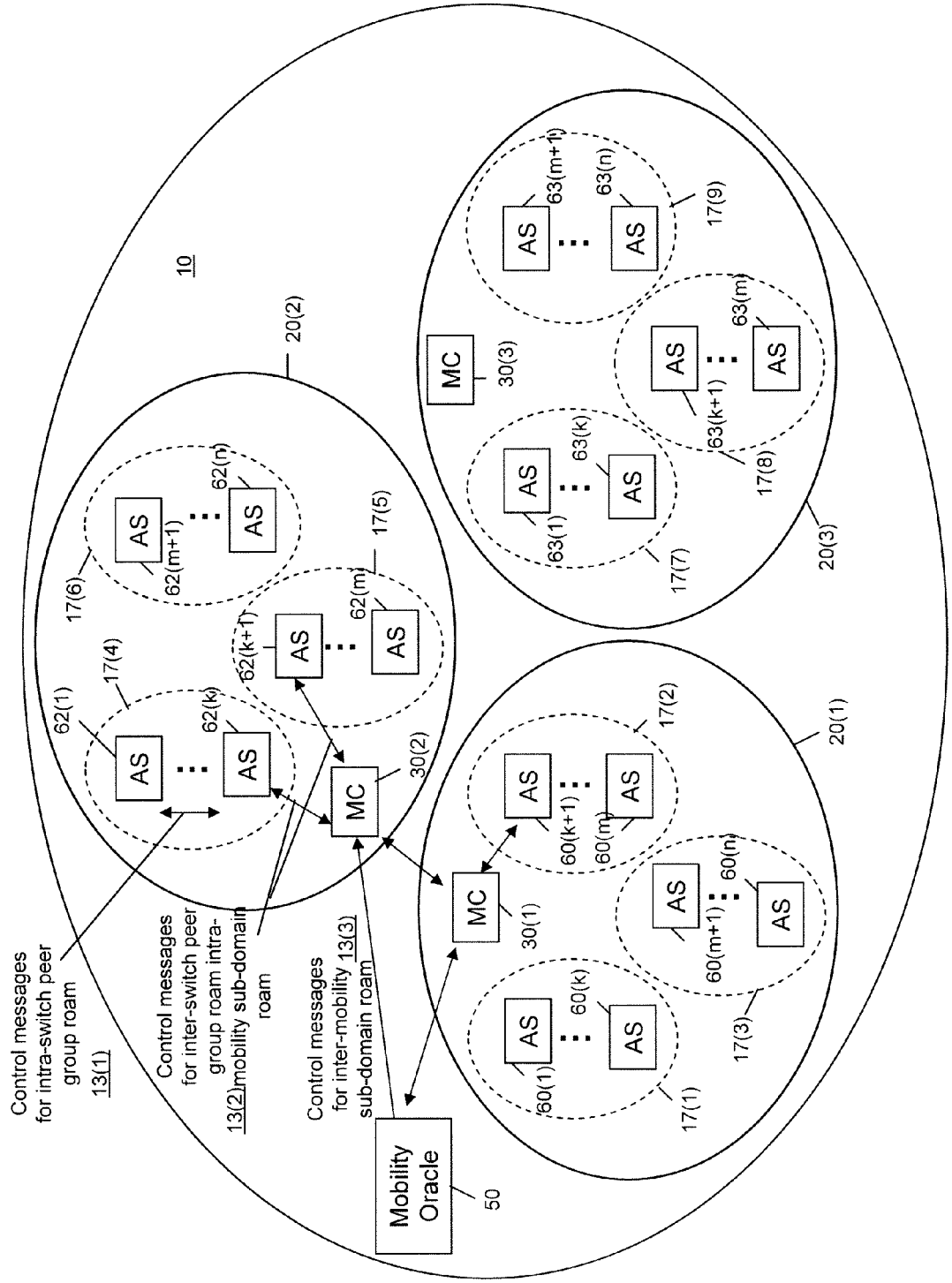
FIG. 2 is an example of a diagram showing the hierarchical levels of the network infrastructure architecture and how control signaling is bound within the levels depending on the nature of a roaming event.

Reference is now made to FIG. 2. FIG. 2 shows the mobility domain 10 in greater detail. In this example, the mobility domain 10 comprises three mobility sub-domains 20(1), 20(2) and 20(3). Each mobility sub-domain comprises a plurality of access switches (AS's) arranged in switch peer groups. For example, mobility sub-domain 20(1) comprises MC 30(1), access switches 60(1)-60(k) in switch peer group 17(1), access switches 60(k+1)-60(m) in switch peer group 60(2) and access switches 60(m+1)-60(n) in switch peer group 17(3). Similarly, mobility sub-domain 20(2) comprises MC 30(2), access switches 62(1)-62(k) in switch peer group 17(4), access switches 62(k+1)-62(m) in switch peer group 17(5) and access switches 62(m+1)-62(n) in switch peer group 17(6). Mobility sub-domain 20(3) comprises MC 30(3), access switches 63(1)-63(k) in switch peer group 17(7), access switches 63(k+1)-63(m) in switch peer group 17(8) and access switches 63(m+1)-63(n) in switch peer group 17(9). Each of the MCs 30(1), 30(2) and 30(3) communicate with the access switches in their respective mobility sub-domains. Moreover, the MCs 30(1), 30(2) and 30(3) communicate with the mobility oracle 50.

FIG. 2 illustrates the general boundary of control message flow for the different types of mobility events that can occur. Mobility or roaming events can be categorized as (1) intra-switch peer group (and intra-mobility-sub-domain), (2) inter-switch peer group (and intra-mobility-sub-domain) and (3) inter-mobility sub-domain. At reference numeral 13(1), the control messages are shown for the intra-switch peer group roaming event. This occurs when a station roams from one access switch to another access switch in the same switch peer group. As shown at 13(1), the control messages stay between access switches in that switch peer group, e.g., switch peer group 17(4) in mobility sub-domain 20(2). In this type of relatively localized roaming event, the control messages stay within the switch peer group and do not reach the MC for that mobility sub-domain. Thus, the MC is not burdened when such a localized roaming event occurs in a mobility sub-domain.

At 13(2), the control messages are shown for an inter-switch peer group (intra-mobility-sub-domain) roaming event. In this case, a station roams from an access switch in one switch peer group to an access switch in another switch peer group, but within the same mobility sub-domain. As shown at 13(2), the control messages flow in and out from the respective switches in the two switch peer groups to and from the MC 30(2) in mobility sub-domain 20(2). The MC for that mobility sub-domain becomes involved in handling the mobility event but the mobility oracle 50 is not involved nor are the MCs for any other mobility sub-domain.

At 13(3), the control messages are shown for an inter-mobility sub-domain roaming event where a station roams from an access switch in one mobility sub-domain to an access switch in another mobility sub-domain. For example, a station roams from an access switch in mobility sub-domain 20(2) to an access switch in mobility sub-domain 20(1), and in particular, to access switch 60(k+1). In this case, control messages will flow across mobility sub-domains between the mobility controllers of the two mobility sub-domains involved. In addition, the mobility oracle 50 will receive and send control messages to handle the mobility event.

Thus, as shown in FIG. 2, the control messages are not sent to all entities (all access switches, MCs and mobility oracle) in the mobility domain. The control messages are bound or contained within a group of entities according to the nature of the mobility event. Higher level control elements, such as mobility controllers and the mobility oracle, do not become involved unless the mobility event involves a station roaming across mobility sub-domains. This helps to keep control message traffic at a minimum and thus reduce control plane overload.

Figure 3:
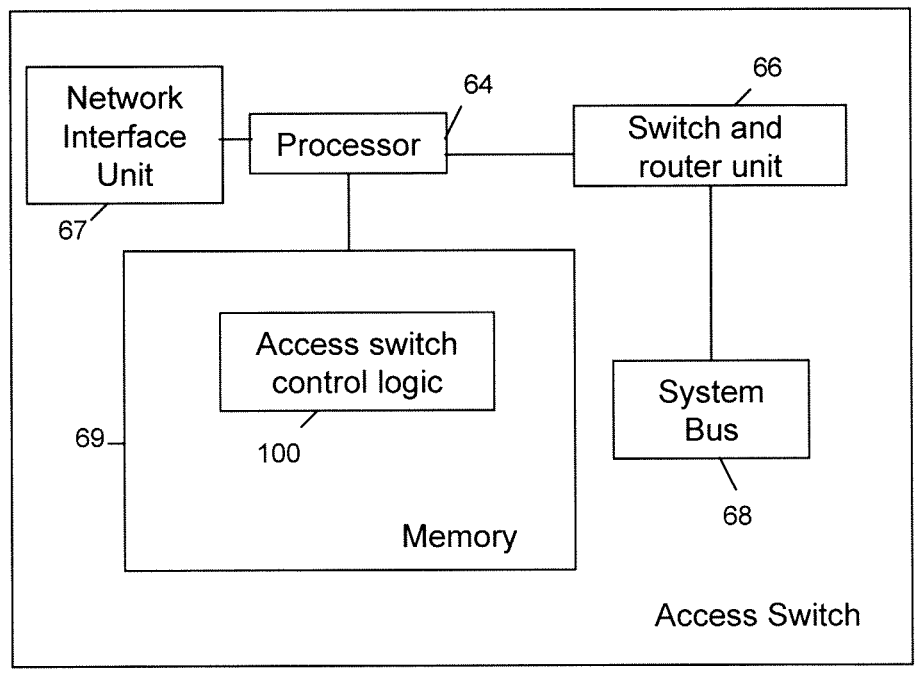
FIG. 3 is an example of a block diagram of an access switch that is part of the network infrastructure architecture shown in FIG. 1.

Reference is now made to FIG. 3 for a description of an example block diagram of an access switch. This diagram is meant to representative of a block diagram for any of the access switches 60(1)-60(4) and 62(1)-62(4) shown in FIG. 1, and in general for any access switch in any mobility sub-domain. The access switch comprises a processor 64, a switch and router unit 66 that may be in the form of an Application Specific Integrated Circuit (ASIC), a network interface unit 67, a system bus 68 and a memory 70. The switch and router unit 66 provides the packet forwarding (routing) and switching functions that are well known for a network access switch. The network interface unit 67 processes packets for transmission over the network and processes packets received from the network For example, the network interface unit 67 is an Ethernet card or similar device. The access switch is also referred to herein as a "forwarder" because it forwards packets to and from a client device. Instructions for access switch control logic 100 are stored in the memory 69 for execution by the processor 64. As explained above, an access switch is configured to serve IP addresses in one or more IP subnets.

The processor 64 may be a programmable processor or a fixed-logic processor. In the case of a programmable processor, the memory 69 is any type of tangible processor readable memory (e.g., random access, read-only, etc.) that is encoded with or stores instructions that, when executed by the processor 64, cause the processor to perform a variety of functions including the functions of the access switch control logic 100 described herein. Alternatively, the processor 64 may a fixed-logic processing device, such as an ASIC or digital signal processor or a network processor or a general purpose processor, that is configured with firmware comprised of instructions that cause the processor(s) 64 to perform the functions described herein. Thus, instructions for the logic 100 may take any of a variety of forms, so as to be encoded in one or more tangible media for execution, such as with fixed logic or programmable logic (e.g., software/computer instructions executed by a processor) and the processor(s) 64 may be a programmable processor, programmable digital logic (e.g., field programmable gate array) or an ASIC that comprises fixed digital logic, or a combination thereof.

Examples of functions of the access switch control logic 100 are described hereinafter in connection with FIGS. 7-11. These functions include "mobility agent" functions and datapath functions. The mobility agent functions are responsible for handling mobility events on the access switch, configuring the datapath elements on the switch for mobility and communicating with the MC. The datapath functions include terminating the CAPWAP tunnels which encapsulate IEEE 802.11 traffic sourced by wireless client devices, allowing the access switch to treat wired and wireless traffic in a uniform fashion.

More specifically, the functions of the mobility agent in the access switch are as follows. The mobility agent is responsible for responding in a timely manner to mobility control protocol messages sent by the various entities in the network, ensuring that a roaming budget time period is maintained for client devices. If the wireless subnets are not available at the MC/MTE, then the mobility agent assumes the role of the point of presence for roamed client devices that were originally associated with it. When the network is configured in a Layer 2 mode, the mobility agent is responsible for advertising reachability for the client devices connected to it. If tunneling is employed, an Address Resolution Protocol (ARP) request would be transmitted on behalf of the client device through the tunnel, which the point of presence (access switch) would bridge onto its uplink interface. The mobility agent is responsible for subscribing to multicast groups on behalf of a client device after a roaming event has occurred. This information is passed as part of the context to the new access switch to ensure that the multicast flows follow the client device as it roams. When the access switch is connected to a Layer 3 access network, the mobility agent is responsible for injecting routes for the client devices that are associated with it for which tunneling is not provided. The mobility agent performs an 802.1X authenticator function for both wired and wireless client devices. Finally, when a station successfully authenticates to the network, the mobility agent forwards the Pairwise Master Key (PMK) to the MC, and the MC is responsible for flooding the PMK to all of the access switches in the mobility sub-domain.

Figure 4:
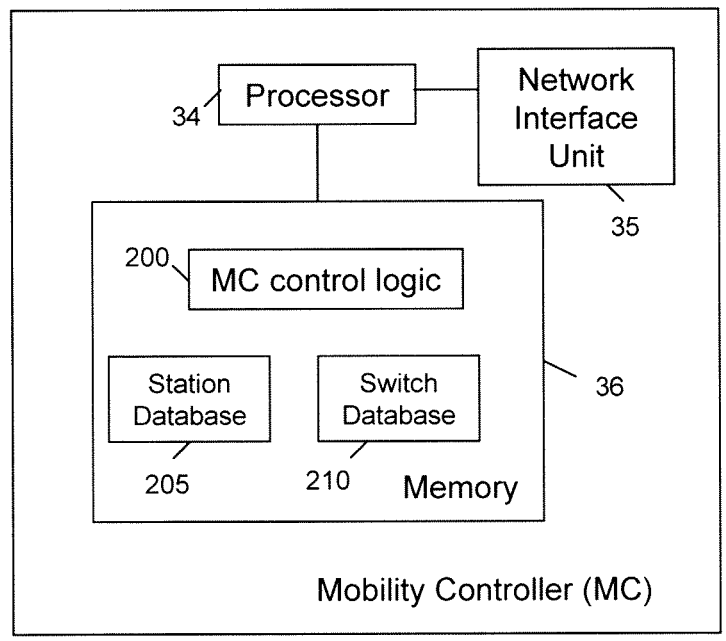
FIG. 4 is an example of a block diagram of mobility controller apparatus that is part of the network infrastructure architecture shown in FIG. 1.

Turning now to FIG. 4, an example block diagram of an MC is now described. An MC is a control apparatus that may be embodied by a computing apparatus comprising a processor 34, a network interface unit 35 and a memory 36. Examples of specific embodiments of the processor 34 and the network interface unit 35 are described above in connection with FIG. 2. The memory 36 stores MC control process logic that, when executed by the processor 34, cause the processor 34 to perform the MC functions described herein. In addition, the memory 36 stores a stations database 205 and a switch database 210.

The stations database 205 maintains a database of all wireless client devices that are being served within the local sub-domain or the entire mobility domain (if the MC is configured to serve the entire mobility domain). This database may not store full client device context and may only include information indicating whether the client device currently considers the local sub-domain as its home, and is in many ways very similar to the function provided by the mobility oracle, although with a more limited scope, i.e., only for client devices local to the sub-domain. The database may include additional information such as the client device's credentials, which could be in the form of the user's identity, or a common name in a certificate, as well as the IP Address assigned to the device, if one has already been assigned to it by the network.

The switch database 210 maintains a database of all access switches within the mobility sub-domain, and updates all of the access switches, in real-time, as changes to the database occur (e.g., addition or removal of a switch from the network).

Other functions of the MC are summarized as follows. The MC is responsible for responding in a timely manner to mobility control protocol messages from other entities to ensure that the system achieves the desired roaming budget. The MC acts as a gateway between the access switches and the mobility oracle. When the MC does not find a match in its local database, it forwards the request to the mobility oracle, which is responsible for the entire mobility domain. However, there are deployment scenarios where the MC is responsible for the entire mobility domain. When tunneling is employed for a client device, its point of presence on the network could be the MTE if the wireless subnets are available at the MTE. Therefore, in these cases, the MC will respond to any ARP requests received for the client devices it is responsible for. When the MC is connected to a Layer 3 network, it is responsible for injecting routes into the network for the client devices it provides service for via a tunnel. The MC is the control point for the access switches for all mobility management related requests. When a change in a client device's point of attachment occurs, the MC is responsible for configuring the proper forwarding policy on the MTE, which may be co-located with the MC. If the MC and the MTEs are physically separate, the MC is responsible for initiating the signaling to the MTE to enforce changes in the client device's point of attachment in the network. The MC is capable of handling unsolicited commands from the Remote Authentication Dial-in User Service (RADIUS) infrastructure. These messages can be received by an access switch and forwarded to the MC to clear out or update the client key cache entries. It is also the responsibility of the MC to forward these messages to other MCs in mobility domain if a message is received from access switch. Finally, the MC optionally acts as an Network Time Server to the access switches to allow all access switches within a mobility sub-domain to have their clocks synchronized. The MC in turn synchronizes its clock off the mobility oracle.

Figure 5:
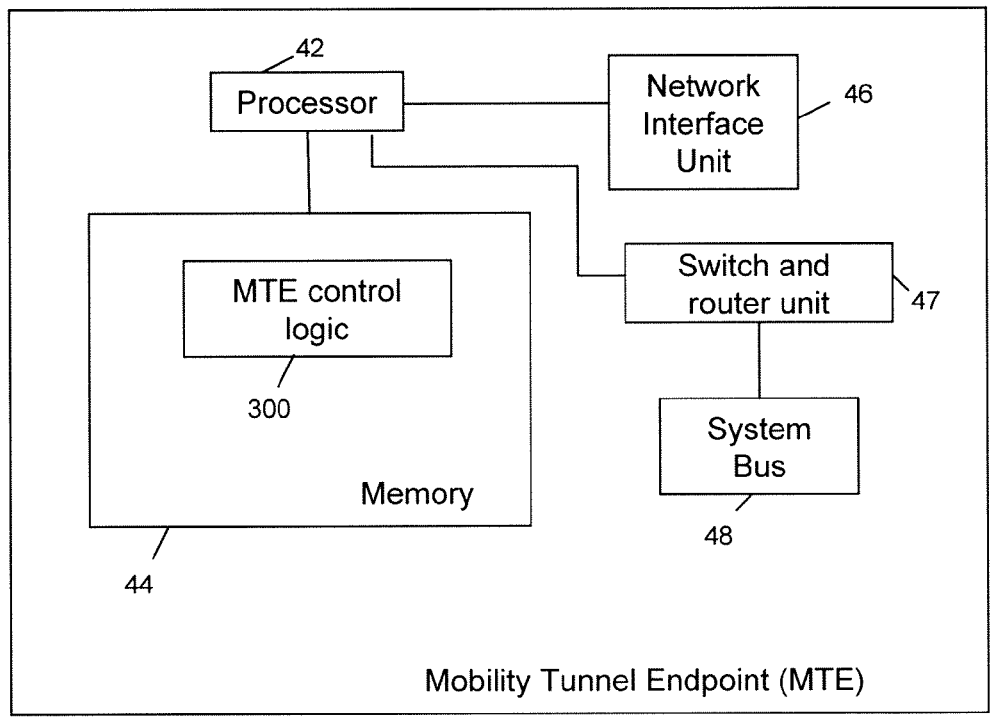
FIG. 5 is an example of a block diagram of a mobility tunnel endpoint apparatus that is part of the network infrastructure architecture shown in FIG. 1.

Turning to FIG. 5, an example block diagram of an MTE is now described. The MTE is a routing apparatus that may also have processing functions. The MTE comprises a processor 42, a memory 44 and a network interface unit 46. The MTE may be integrated into a distribution switch or router and to this end FIG. 4 shows basic switching components including a switch and router unit 47 and a system bus 48. Instructions are stored in the memory 44 for MTE control logic 300. The processor 42 executes the instructions for the MTE control logic 300 to perform the various MTE functions described herein.

The MTE handles the mobility data plane. The role of the MTE is different depending on whether or not it is serving as the point of presence for client devices in the sub-domain. If the wireless subnets are not available at the MTE, then the point of presence for roamed client devices is at the home access switch. In this scenario, the MTE serves as a tunnel switching entity that connects the foreign access switch (point of attachment) to the home access switch (point of presence). If the wireless subnets are available at the MTE, then the MTE serves as the point of presence.

The functions of the MTE are generally as follows. The MTE terminates "mobility" tunnels from the access switches in its mobility sub-domain. Thus, there are pre-established tunnels between the MTE and each access switch in a given mobility sub-domain. Traffic to and from the roamed client device is sent to the foreign access switch via the mobility tunnel. An MTE-MTE tunnel is used to tunnel traffic between mobility sub-domains. The MTE has an interface the MC uses to configure the MTEs forwarding tables to reflect mobility events. When the MC and MTE are collocated, this is simply an API. If both functions are not collocated, this is a protocol.

As explained herein, the MC and MTE functions may be implemented by separate physical entities. In the case where they are implemented in a single entity, the MTE does not actually act as a router, and therefore does not inject routes into the network. The MC is responsible for advertising routes. However, the interfaces on which the routes are injected are considered part of the MTE. In the unlikely event that the MTE is decoupled from the MC, it is responsible for transmitting certain packets on behalf of the MC. For instance, the MC will provide Proxy ARP and routing services, yet these packets are transmitted on the MTEs interfaces. For networks that do not make use of tunneling, the MTE is not a necessary function.

Figure 6:
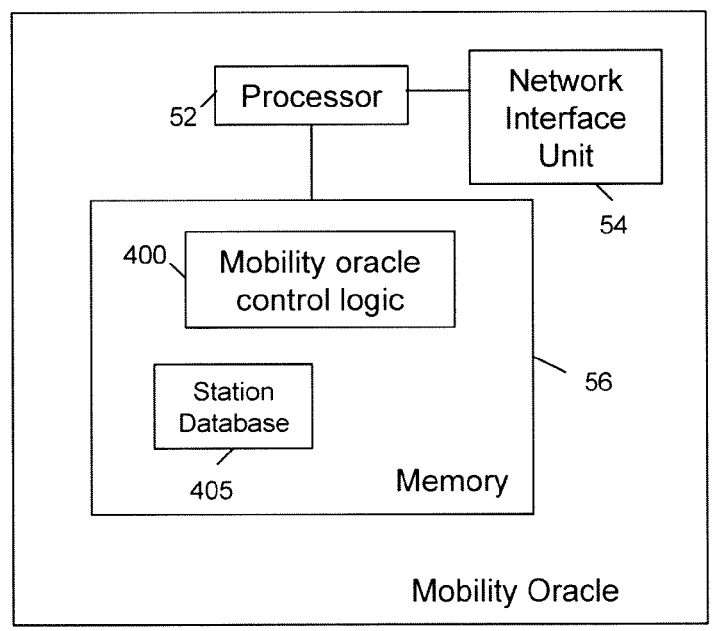
FIG. 6 is an example of a block diagram of a mobility oracle apparatus that is part of the network infrastructure architecture shown in FIG. 1.

Reference is now made to FIG. 6 for a description a block diagram of the mobility oracle 50. The mobility oracle 50 is a central controller for the mobility domain and contains a centralized database that includes information on each of the client devices in the network, their home mobility sub-domain and the current foreign sub-domain providing service. The mobility oracle 50 is a computing apparatus with network connectivity that oversees the entire mobility domain, but it does not necessarily perform any routing or packet forwarding functions. The mobility oracle 50 comprises a processor 52, a network interface unit 54 to provide network connectivity with the MCs and MTEs in the mobility domain, and a memory 56 that stores mobility oracle control logic 400 and a station database 405. The station database 405 maintains a database of all stations that are being provided service within the mobility domain. This station database 405 is populated through interactions the mobility oracle has with all of the MCs in all of the mobility sub-domains it supports. The station database includes each station's MAC address, its current home mobility sub-domain, and if roaming, its current foreign mobility sub-domain. When the mobility oracle 50 receives a request from an MC, it is responsible for performing the station lookup, and forwarding the request to the proper MC. The mobility oracle 50 acts as a Network Time Protocol (NTP) server to the MCs to allow all of the controllers within the mobility domain to have their clocks synchronized. The functions of the mobility oracle control logic 400 are described hereinafter in connection with FIGS. 7-11.

The following terms are defined for convenience in connection with the descriptions herein.

Foreign Mobility Controller: The MC providing mobility management service for the client device in a foreign mobility sub-domain. The foreign MC acts as a liaison between access switches in the foreign sub-domain and the MC in the home sub-domain.

Foreign Mobility Sub-Domain: The mobility sub-domain, controlled by a MC, supporting a client device which is anchored in (its IP address is part of an IP subnet of) another mobility sub-domain.

Foreign Switch: The access switch in the foreign mobility sub-domain currently providing service to the client device.

Home Mobility Controller: The MC providing the single point of control and mobility management service for client devices in their home mobility sub-domain.

Home Mobility Sub-Domain: The mobility sub-domain, controlled by a MC, for a client device where its IP address was assigned.

Home Access Switch: The access switch in the home mobility sub-domain that serves the IP subnet that includes the IP address of the client device and that last provided service to that client device. The Home Access Switch may not be the access switch where the wireless device initially joined the mobility domain.

Mobility Domain: A collection of mobility sub-domains across which mobility needs to be supported.

Mobility Sub-Domain: The mobility sub-domain is an autonomous component of the overall mobility domain network. A sub-domain generally connects into the core network, and includes one or more MC functions, and optionally their associated MTEs. A mobility sub-domain is the set of devices managed by the active Mobility Controller. A mobility sub-domain comprises of a set of access switches, and associated APs, across which fast roaming is desired. A mobility sub-domain is equivalent to an 802.11r key domain. The mobility sub-domain may also be referred to as an IP Everywhere (IPe) sub-domain. A mobility sub-domain and an mobility sub-domain are terms that are used interchangeably herein.

Point of Attachment: A client device's point of attachment is where the client is currently associated to the wireless network. This could either be the access switch that is currently providing service to the AP where the client device is associated, or the WLAN controller in the case of a legacy deployment. Thus, a wireless client device may roam from one AP on a first access switch to another AP on a second access switch and thereby become "attached" at or on the second access switch.

Point of Presence: A client device's point of presence is the place in the network where the client device is being advertised. For instance, if an access switch is advertising reachability to the client device via a routing protocol, the interface on which the route is being advertised is considered the client device's point of presence.

Station: A client device that connects to and requests service from the network. The device may have a wired, wireless or both interfaces. The term station may be used interchangeably with the term client device.

The MTE can have two different roles depending on the availability of the subnets for the roamed station at the MTE. If the subnet of the roamed station is available at the MTE, the MTE could become the point of presence; other it functions as a tunnel switching entity that connects the roamed station to the point of presence, which could be an access switch. In the following examples, the tunneling architecture is used and the wireless subnets are not available at the MTE.

When the wireless VLANs or IP subnets are not available at the MTE, then the point of presence for an Layer 3 roamed station is maintained on the original or anchor access switch—the access switch to which the station initially (for the first) joined (associated in) the network. In this case the MC/MTE becomes the tunnel switch point, where the MTE serves as a tunneling endpoint apparatus and switches the traffic from the tunnel from the foreign access switch to another tunnel to an anchor access switch and vice versa. This scenario can happen if the MC/MTE is not located at the distribution layer, but is deeper in the network, at the core. In fact, this is a very likely scenario during the transition from an overlay WLAN controller architecture to the architecture disclosed herein, since the WLAN controller which will serve as the controller for legacy switches and MC/MTE for the access switches is often at the core of the network.

Figure 7:
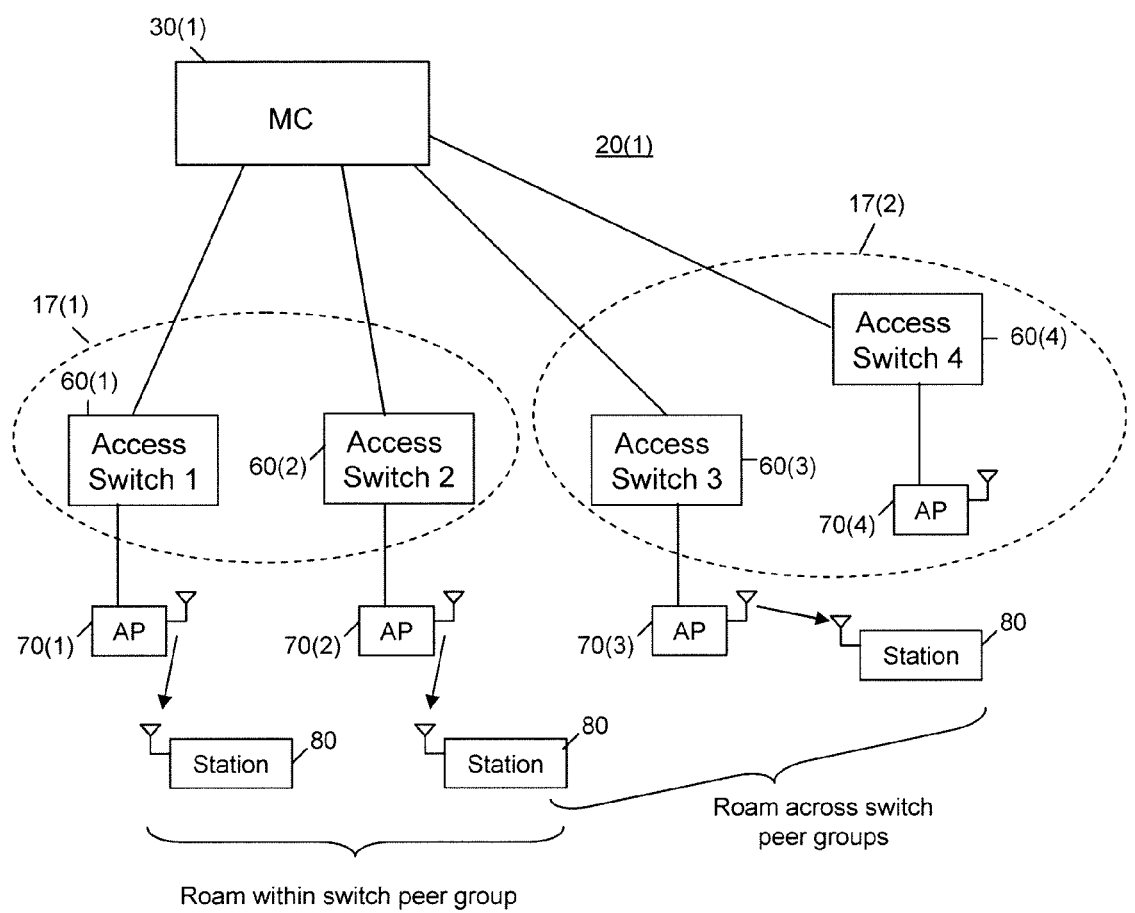
FIG. 7 is an example of a diagram showing part of the network infrastructure shown in FIG. 1 and further illustrating a device roaming between access switches within a mobility sub-domain.
Figure 8:
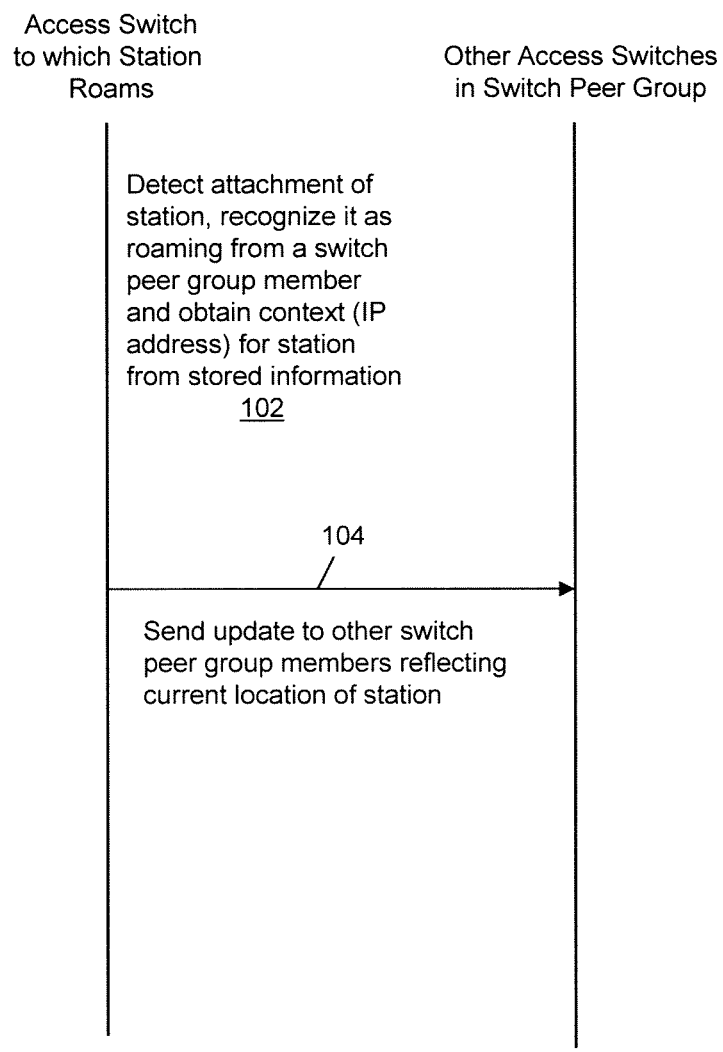
FIG. 8 is an example of a ladder flow diagram illustrating control signaling between entities for a roaming scenario within a switch peer group depicted in FIG. 7.
Figure 9:
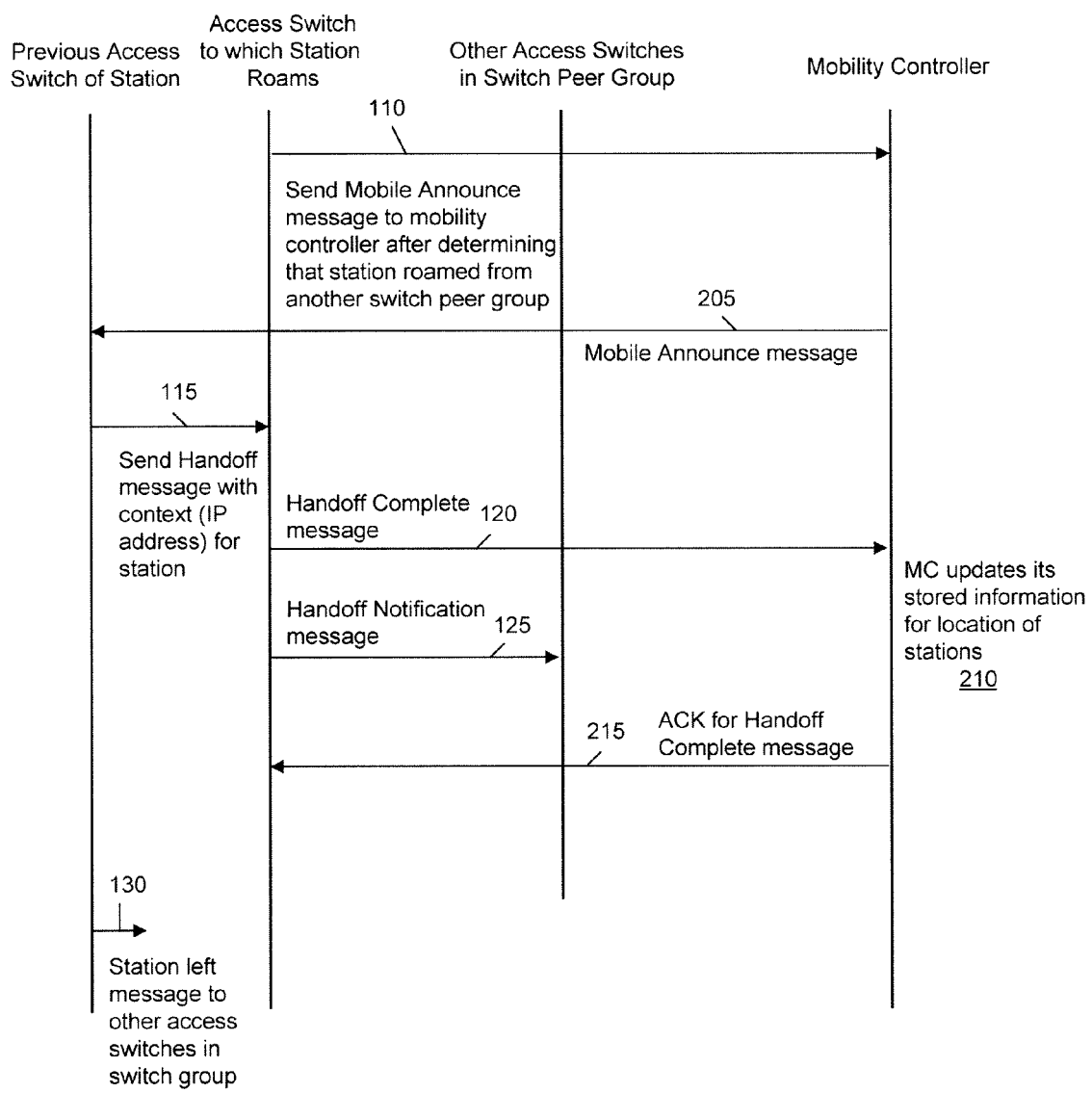
FIG. 9 is an example of a ladder flow diagram illustrating control signaling between entities for a roaming scenario across switch peer groups but within a mobility sub-domain.

In the scenarios described hereinafter in connection with FIGS. 7-11, a wireless station roams from one access switch to another access switch by associating with an AP on a different access switch. For simplicity, a wireless station is said to roam from access switch to access switch but it is understood that this involves the wireless station leaving the service of one AP and associating to an AP on a different access switch. In FIGS. 7 and 9, reference numerals in the 100's refer to operations of an access switch, reference numerals in the 200's refer to operations of an MC, reference numerals in the 300's refer to operations of an MTE, and reference numerals in the 400's refer to operations of the mobility oracle.

FIG. 7 illustrates the roaming or mobility event type where a station roams roam within a switch peer group and the roaming or mobility event where a station roams across switch peer groups but within the same mobility sub-domains. In this scenario, the access switch to which the wireless station was previously attached is an access switch that serves the IP subnet that includes an IP address of the wireless station and the access switch to which the wireless station roams is an access switch that does not serve the IP subnet for the wireless station. Furthermore, the "previous" access switch as indicated in FIG. 7 need not be the same access switch where the wireless station initially connected to the network since multiple access switches can serve multiple (and common) IP subnets. FIG. 8 illustrates a flow diagram depicting control signal flows for the intra-switch peer group roaming scenario of FIG. 7 and FIG. 9 illustrates the control signal flows for the inter-switch peer group roaming scenario of FIG. 7.

Referring now to FIG. 7, a block diagram is shown of a portion of the mobility domain shown in FIG. 1, and in particular access switches within a single mobility sub-domain, e.g., sub-domain 20(1). Access switches 60(1)-60(4) of mobility sub-domain 20(1) are shown, where access switches 60(1) and 60(2) are part of the same switch peer group 17(1) and access switches 60(3) and 60(4) are part of a different switch peer group 17(2). A wireless station 80 is shown that initially joins the network by associating to an AP 70(1) that is on access switch 60(1), and is an example of a particular wireless client device that roams within the mobility domain. Accordingly, the station 80 is given an IP address from a subnet available on, or served by, the access switch 60(2). Therefore, while the station 80 is associated to an AP on access switch 60(2), its point of presence and point of attachment are the same: access switch 60(2).

When station 80 roams to an access switch in the same switch peer group, e.g., to access switch 60(2) in switch peer group 17(1), no handoff is necessary because all of the access switches in the same switch peer group share context information about the stations attached to them. This relatively simple scenario is shown in the ladder flow diagram of FIG. 8. At 102, the access switch in the same switch peer group to which a station roams, e.g., access switch 60(2), detects attachment of the station, recognizes it as roaming from a switch peer group member and obtains its context (IP address information) for the station from information that it stores. In general, whenever an access switch detects association of a station at AP that it serves, the access switch is configured to compare an identifier of the station with the information stored at the access switch to determine whether the station was previously located on another access switch in the switch peer group of which that access switch is a part. Thus, each access switch stores context and client policy information about all stations connected to any access switch in its switch peer group.

At 104, when a particular access switch determines that the station was previously located on another access switch in the same switch peer group, the particular access switch to which the station roams sends an update to all other access switches that are members of that switch peer group so that they can update their store information to reflect the current location of the station in the switch peer group. Thus, all access switches in the switch peer group will know that the station is currently attached to another access switch, e.g., access switch 60(2), in the switch peer group 17(1). The MC 30(1) is not notified of this roaming event nor is any of the access switches in other switch peer groups.

Referring back to FIG. 7, another type of roaming event occurs when the station 80 roams from an access switch in one switch peer group to an access switch in another switch peer group. For example, the station 80 roams from the AP 70(2) on access switch 60(2) in switch peer group 17(1) to AP 70(3) on access switch 60(3) in switch peer group 17(2). FIG. 9 illustrates the control signal flow for this type of roaming event.

An access switch is configured to send a Mobile Announce message to the MC of its mobility sub-domain in which the access switch resides when the access switch determines, based on a comparison of an identifier (e.g., MAC address) of the station with its stored information, that the station was not previously located at another access switch within the switch peer group in which that access switch is a part. Accordingly, when an access switch to which the station roams detects the association of the station (by way of an AP on that access switch) and after the station is authenticated, it sends a Mobile Announce message to the mobility controller for that mobility sub-domain. This is shown at reference numeral 110. The Mobile Announce message comprises information identifying the roamed station, e.g., MAC address of the roamed station of the roamed station, and an identifier of the access switch to which the station has roamed.

The mobility controller for that mobility sub-domain receives the Mobile Announce message and does a look up in its station database to determine the access switch where the station was previously located, i.e., where it was last attached where its IP subnet is available, which may, but not in all cases, be the access switch where the station initially joined to the network, which in the scenario of FIG. 9 is in the same particular mobility sub-domain as the particular access switch to which the station has roamed, but in a different switch peer group than the particular access switch. After making this determination, the mobility controller, at 205, sends the Mobile Announce message to the access switch where the station was previously attached and also serves the IP subnet for the IP address of that station. The access switch that receives the Mobile Announce message obtains the identity of the original source of the Mobile Announce message (the access switch where the station has roamed) and the identity of the station that has roamed, and at 115 sends a Handoff message to the access switch to which the station has roamed. The Handoff message contains context information about the station, that is information identifying the station, including the IP address of the station and MAC address of the station and any policies associated with the station.

The access switch where the station is currently attached receives the Handoff message and generates a Handoff Complete message that it sends, at 120, to the mobility controller for the mobility sub-domain. The Handoff Complete message confirms that the station is connected at that access switch and also contains the identity of that access switch. In response to the mobility controller receiving and processing the Handoff Complete message, it updates its stored information for the locations of stations as shown at 210. At 125, the access switch where the station is currently attached sends a Handoff Notification message to other access switches in its switch peer group to update the location of the station among the switches in its switch peer group thereby informing the switch peer group member access switches that the station is now attached to an access switch in that switch peer group.

At 215, the mobility controller sends to the access switch where the station is currently attached an acknowledgment (ACK) message for the Handoff Complete message. At 130, the access switch from which the station has roamed sends out a message to its switch peer group members to notify them that the station has left the switch peer group.

Figure 10:
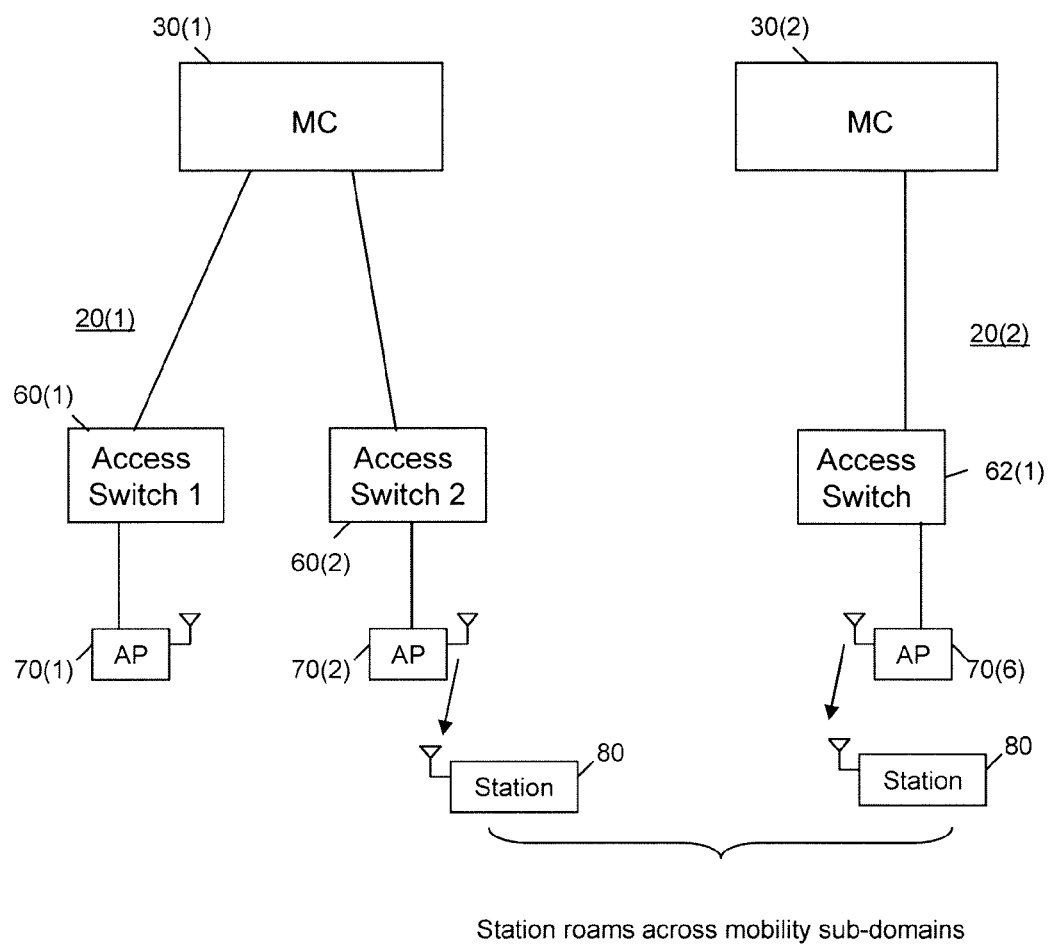
FIG. 10 is an example of a diagram showing part of the network infrastructure shown in FIG. 1 and further illustrating a device roaming between access switches across mobility sub-domains.

Turning now to FIG. 10, an example of an inter-mobility-sub-domain roaming event is shown. In this example, the station 80 is currently associated with an AP 70(2) on access switch 60(2) in mobility sub-domain 20(1). The station 80 roams to and associates with AP 70(6) on access switch 62(1) in mobility sub-domain 20(2). For simplicity, the access switches in the same and other switch peer groups are not shown in FIG. 10 for mobility sub-domains 20(1) and 20(2).

Figure 11:
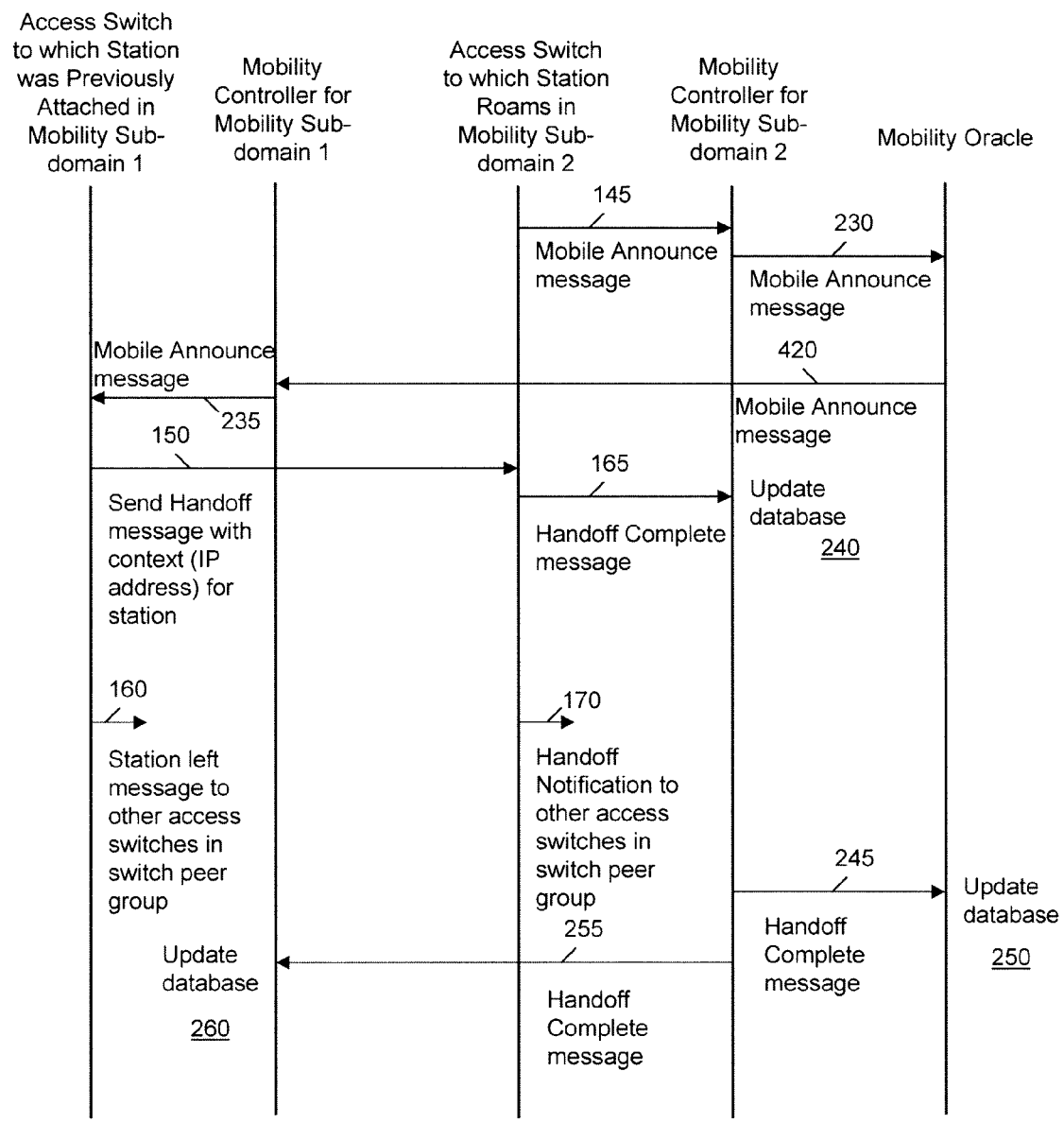
FIG. 11 is an example of a ladder flow diagram illustrating control signaling between entities for the roaming scenario depicted in FIG. 10.

Reference is now made to FIG. 11 for a description for the control signal flow for the mobility event shown in FIG. 10. In FIG. 11, mobility sub-domain 1 is the mobility sub-domain from which the station has roamed and mobility sub-domain 2 is the mobility sub-domain to which the station has roamed. Again, when an access switch detects attachment of a station that it determines not to have been previously attached to a switch in its switch peer group, then the access switch sends a Mobile Announce message at 145 to the mobility controller for its mobility sub-domain, mobility sub-domain 1.

The mobility controller for the foreign mobility sub-domain, mobility sub-domain 2, also may not know the station 80 if it is the first time that the station is moving to this mobility sub-domain. The mobility controller in each mobility sub-domain is configured to forward the Mobile Announce message it receives from an access switch within its mobility sub-domain to the mobility oracle 50 (also referred to herein as a central controller device) when the mobility controller determines, from its station database, that the station was not previously attached to an access switch within its mobility sub-domain and does not otherwise have stored information about the station, i.e., where the station was previously attached, its IP address, etc. Therefore, at 230, the mobility controller forwards the Mobile Announce message to the mobility oracle.

The mobility oracle determines, from its stations database, the mobility controller for the home mobility sub-domain for station 80 based on information contained in the Mobile Announce message that identifies the station 80. In other words, the mobility oracle determines the mobility sub-domain where the wireless client device had been previously located and forwards the Mobile Announce message to the mobility controller for that mobility sub-domain. The station may have roamed to several mobility sub-domains before reaching an access switch for the current mobility sub-domain. The mobility controller for the mobility sub-domain where the station was previously located, in most cases, has the context information for the station. Using this information, at 420 the mobility oracle forwards the Mobile Announce message to the mobility controller for the mobility sub-domain 1, which in this example, is the mobility sub-domain where the station was previously located.

The mobility controller for mobility sub-domain 1, upon receiving the Mobile Announce message, determines based on its stored information, the access switch where the station was previously attached. At 235, the mobility controller in mobility sub-domain 1 forwards the Mobile Announce message to the access switch where it determines that the station was previously located in mobility sub-domain 1. This access switch, in response to receiving the Mobile Announce message, learns that the station 80 has roamed to a particular access switch in mobility sub-domain 2 from the content of the Mobile Announce message, and in response at 150 sends a Handoff message to the access switch in mobility sub-domain 2 where the station is currently attached. The Handoff message contains the context for the station (e.g., IP address, MAC address, etc.) and other client policies associated with the station.

At 160, the access switch in mobility sub-domain 1 sends a message to other switches in its switch peer group to notify those access switches that the station has left the switch peer group. In other words, in response to receiving the Mobile Announce message, each access switch is configured to generate and send a message to other access switches in its switch peer group, the message indicating that a station that was previously attached to it has roamed outside the switch peer group.

At 165, in response to receiving the Handoff message and after receiving and processing it, the access switch in mobility sub-domain 2 where the station is currently attached sends a Handoff Complete message to the mobility controller in mobility sub-domain 2. In response to receiving the Handoff Complete message from the access switch where the station is currently attached, the mobility controller in mobility sub-domain 2 updates its station database accordingly at 240 to reflect the current location of the station based on the Handoff Complete message. Also, at 245 the mobility controller in mobility sub-domain 2 sends or forwards the Handoff Complete message to the mobility oracle. The mobility oracle updates its database at 250 to indicate the location of the station in mobility sub-domain 2.

At 170, the access switch where the station is currently attached sends a Handoff Notification message to other access switches in its switch peer group in mobility sub-domain 2 so that the access switches in this switch peer group know about the location of the station in the switch peer group.

At 255, the mobility controller in mobility sub-domain 2 sends a Handoff Complete message to the mobility controller in mobility sub-domain 1. At 265, the mobility controller in mobility sub-domain 1 updates its database to reflect the fact that the station is no longer in mobility sub-domain 1.

It is possible for a station to move prior to the Handoff Complete notification being sent to a mobility controller. Individual access switch and network congestion could cause the Handoff Complete messages to be processed in the wrong order, which would cause traffic for the station to be delivered to the wrong access switch. A timestamp or sequence number ensures that Handoff and Handoff Complete messages are treated in the proper order. This could be achieved through the use of NTP with each mobility controller serving as the NTP source (time synchronization information) for all switches within its mobility sub-domain. Although ideal, it is not necessary for the time on the mobility controller be correct, as long as all of the access switches are synchronized. Proper time may be useful for other purposes, which includes the synchronization of system log events across multiple network devices.

In sum, a system is provided comprising a plurality of access switches configured to serve one or more Internet Protocol (IP) subnets that comprises a plurality of IP addresses. The plurality of access switches are arranged in switch peer groups such that each access switch within a given switch peer group is configured to store information about other access switches in that switch peer group and about locations of wireless client devices that are associated with any wireless access point on any access switch in the switch peer group. The plurality of access switches are further grouped into a corresponding one of a plurality of mobility sub-domains each comprising a plurality of switch peer groups. A plurality of controller devices are provided, each configured to control access switches in a corresponding mobility sub-domain. Each controller device stores information about the plurality of access switches within its mobility sub-domain and about locations of wireless client devices at access switches in its mobility sub-domain. A central controller device is provided and configured to communicate with the plurality of controller devices for the respective mobility sub-domains. The central controller device is configured to store information about locations of wireless client devices in the mobility sub-domains.

Similarly, a method is provided comprising, for a plurality of access switches each configured to serve one or more Internet Protocol (IP) subnets that comprises a plurality of IP addresses, arranging the plurality of access switches arranged in switch peer groups; each access switch within a given switch peer group storing information about other access switches in that switch peer group and about locations of wireless client devices that are associated with any wireless access point on any access switch in the switch peer group; grouping the plurality of access switches into a corresponding one of a plurality of mobility sub-domains each comprising a plurality of switch peer groups; at each access switch, storing information about the locations of wireless client devices at access switches within the same switch peer group; at a mobility controller dedicated to a respective mobility sub-domain, storing information about the locations of wireless client devices at access switches within the respective mobility sub-domain; and at a central controller that communicates with the mobility controllers for all of the mobility sub-domains, storing information about locations of wireless client devices in the mobility sub-domains.

The terms "first" and "second" when referring to the mobility sub-domains, for example, are arbitrary and used for purposes of explaining the techniques described herein. The first mobility sub-domain may be the sub-domain where a particular wireless client device is current located and the second mobility sub-domain may be the sub-domain where the particular wireless client device was previously located.

The techniques described herein have several advantages. First, both wired and wireless clients can be present on the same IP subnet, allowing for uniform handling of wired and wireless clients, uniform policy application and uniform management of the clients. Second, this hierarchical architecture allows the network to scale much better and support more APs and clients, compared to current architectures. This is achieved primarily by controlling the cost of handoffs on the control path, and by distributing the data path to the access switches. Third, by configuring the point of presence for a station to be on access switch that serves the IP subnet for that station (the access switch that the station was mostly recently attached to that served its IP subnet), a flexible deployment of the MCs/MTEs may be made. Customers who have their current WLAN controllers in the core (past the first routing boundary) can easily migrate to this architecture, while existing WLAN controllers can continue to operate in the network as MCs/MTEs.

The above description is by way of example only.

What is claimed is:

1. A system comprising:
a plurality of access switches configured to serve one or more Internet Protocol (IP) subnets that comprises a plurality of IP addresses, the plurality of access switches arranged in switch peer groups such that each access switch within a given switch peer group is configured to store information about other access switches in that switch peer group and about locations of wireless client devices that are associated with any wireless access point on any access switch in the switch peer group, the plurality of access switches being further grouped into a corresponding one of a plurality of mobility sub-domains each comprising a plurality of switch peer groups;
a plurality of controller devices each configured to control access switches in a corresponding mobility sub-domain, each controller device storing information about the plurality of access switches within its mobility sub-domain and about locations of wireless client devices at access switches in its mobility sub-domain; and
a central controller device configured to communicate with the plurality of controller devices for the respective mobility sub-domains, the central controller device configured to store information about locations of wireless client devices in the mobility sub-domains,
wherein when a particular wireless client device roams from a first mobility sub-domain to a second mobility sub-domain, the controller device assigned to the second mobility sub-domain forwards an announce message from the particular wireless client device to an access switch of the first mobility sub-domain where the particular wireless client device was most previously attached, and wherein the access switch that receives the announce message forwarded by the controller device sends a handoff message to a particular access switch in the second mobility sub-domain where the particular wireless client device is currently located, wherein the handoff message contains context for the particular wireless client device and other client policies associated with the particular wireless client device.

2. The system of claim 1, wherein upon detecting that the particular wireless client device has associated to a wireless access point device on the particular access switch, the particular access switch in the second mobility sub-domain is configured to compare an identifier of the particular wireless client device with the information stored at the particular access switch to determine whether the particular wireless client device was previously located on another access switch in the switch peer group of which the particular access switch is a part.

3. The system of claim 2, wherein when the particular access switch determines that the particular wireless client device was previously located on another access switch in the switch peer group of the particular access switch, the particular access switch sends a message to all other access switches in that switch peer group to indicate the current location of the particular wireless client device in the switch peer group.

4. The system of claim 2, wherein the particular access switch is further configured to send the announce message to the controller device for the first second mobility sub-domain when the particular access switch determines that the particular wireless client device was not previously located at another access switch within the switch peer group in which the particular access switch is a part.

5. The system of claim 4, wherein the controller device for the second mobility sub-domain for the particular access switch is configured to determine the access switch within the first mobility sub-domain where the particular wireless client device was previously located and to forward the announce message to the access switch within the first mobility sub-domain where the particular wireless client device was previously located.

6. The system of claim 5, wherein the access switch where the particular wireless client device was previously located in the first mobility sub-domain is configured to send the handoff message to the particular access switch where the particular wireless client device is currently located, the handoff message including the IP address of the particular wireless client device and other client policies associated with the particular wireless client device.

7. The system of claim 5, wherein the controller device for the second mobility sub-domain is configured to forward the announce message received from the particular access switch to the central controller device when the controller device for the second mobility sub-domain determines from the announce message that the particular wireless client device was not previously located at an access switch within the second mobility sub-domain and does not otherwise have stored information about the particular wireless client device.

8. The system of claim 7, wherein the central controller device is configured to determine a mobility sub-domain where the particular wireless client device was previously located and to forward the announce message to the controller device for the first mobility sub-domain where the particular wireless device was previously located.

9. The system of claim 1, wherein the particular access switch where the particular wireless client device is currently located is configured to generate and send to the controller device for the second mobility sub-domain a handoff complete message after the access switch has received and processed the handoff message, wherein the controller device for the second mobility sub-domain is configured to update its stored information to reflect the current location of the particular wireless client device based on the handoff complete message.

10. The system of claim 9, wherein the controller device for the second mobility sub-domain is configured to forward the handoff complete message to the central controller device, wherein the central controller device is configured to update its stored information to reflect the current location of the particular wireless client device.

11. The system of claim 1, wherein each controller device for a mobility sub-domain is configured to generate data used to arrange access switches in its mobility sub-domain into switch peer groups, and to send information to the access switches in its mobility sub-domain in order to inform each access switch about the other access switches in its switch peer group.

12. The system of claim 1, wherein each access switch is configured to generate and send a message to other access switches in its switch peer group in response to receiving the announce message indicating that a wireless client device that was previously attached to it has roamed outside of the switch peer group.

13. The system of claim 1, wherein each controller device for a mobility sub-domain is configured to generate and send time synchronization information to each access switch within its mobility sub-domain, for use in providing a timestamp or a sequence number in a handoff message and in a handoff complete message to ensure that traffic for a wireless client device that has moved from attachment to a first access switch to a second access switch is sent to the second access switch that it is currently attached to.

14. The system of claim 1, wherein a corresponding one of the controller devices is provided for a corresponding one of the mobility sub-domains.

15. The system of claim 1, wherein each of the controller devices communicates with each of the access switches in its corresponding mobility sub-domain via pre-established tunnels.

16. A method comprising:
   for a plurality of access switches each configured to serve one or more Internet Protocol (IP) subnets that comprises a plurality of IP addresses, arranging the plurality of access switches arranged in switch peer groups;
   each access switch within a given switch peer group storing information about other access switches in that switch peer group and about locations of wireless client devices that are associated with any wireless access point on any access switch in the switch peer group;
   grouping the plurality of access switches into a corresponding one of a plurality of mobility sub-domains each comprising a plurality of switch peer groups;
   at each access switch, storing information about the locations of wireless client devices at access switches within the same switch peer group;
   at a mobility controller dedicated to a respective mobility sub-domain, storing information about the locations of wireless client devices at access switches within the respective mobility sub-domain;
   at a central controller that communicates with the mobility controllers for all of the mobility sub-domains, storing information about locations of wireless client devices in the mobility sub-domains;
   determining, by the mobility controller dedicated to the first mobility sub-domain, the access switch within the first mobility sub-domain where a particular wireless client device was previously located and forwarding an announce message to the access switch within the first mobility sub-domain where the particular wireless client device was previously located;

forwarding, by the mobility controller dedicated to the second mobility sub-domain, the announce message from the particular wireless client device to an access switch of the first mobility sub-domain where the particular wireless client device was most previously attached when the particular wireless client device roams from the first mobility sub-domain to the second mobility sub-domain;

receiving, by the access switch of the first mobility sub-domain where the particular wireless client device was most previously attached, the announce message; and sending, by the access switch of the first mobility sub-domain where the particular wireless client device was most previously attached, a handoff message to a particular access switch in the second mobility sub-domain where the particular wireless client device is currently located wherein the handoff message contains context for the particular wireless client device and other client policies associated with the particular wireless client device.

17. The method of claim 16, wherein upon detecting that the particular wireless client device has associated to a wireless access point device on the particular access switch, further comprising the particular access switch in the second mobility sub-domain comparing an identifier of the particular wireless client device with the information stored at the particular access switch to determine whether the particular wireless client device was previously located on another access switch in the switch peer group of which the particular access switch is a part.

18. The method of claim 16, and further comprising the mobility controller for the second mobility sub-domain forwarding the announce message received from the particular access switch to the central controller when the mobility controller for the second mobility sub-domain determines from the announce message that the particular wireless client device was not previously located at an access switch within the second mobility sub-domain and does not otherwise have stored information about the particular wireless client device.

19. The method of claim 18, and further comprising the central controller determining the first mobility sub-domain where the particular wireless client device was previously located and forwarding the announce message to the mobility controller for the first mobility sub-domain where the particular wireless device was previously located.

20. The method of claim 19, and further comprising the mobility controller for the first mobility sub-domain where the particular wireless client device was previously located determining the access switch in the first mobility sub-domain where the particular wireless client device was previously located and forwarding the announce message to the access switch in the first mobility sub-domain where the particular wireless client device was previously located.

21. The method of claim 16, and further comprising each access switch sending a message to other access switches in its switch peer group in response to receiving an announce message indicating that a wireless client device that was previously attached to it has roamed outside of the switch peer group.

22. The method of claim 16, wherein a corresponding one of the mobility controllers is provided for a corresponding one of the mobility sub-domains.

23. The method of claim 16, wherein each of the mobility controllers communicates with each of the access switches in its corresponding mobility sub-domain via pre-established tunnels.

* * * * *